United States Patent [19]

Springer

[11] Patent Number: 5,988,692
[45] Date of Patent: Nov. 23, 1999

[54] METAL TO PLASTIC PIPE TRANSITION FITTING

[75] Inventor: Richard E. Springer, Shawnee, Okla.

[73] Assignee: Central Plastics Company, Shawnee, Okla.

[21] Appl. No.: 09/162,371

[22] Filed: Sep. 28, 1998

[51] Int. Cl.⁶ ..................................................... F16L 9/14
[52] U.S. Cl. .................. 285/55; 285/148.13; 285/288.1; 285/321; 285/351; 285/906
[58] Field of Search ................. 285/148.13, 55, 285/347, 351, 423, 45, 321, 288.1, 906, 302, FOR 156

[56] References Cited

U.S. PATENT DOCUMENTS

| | | | |
|---|---|---|---|
| 3,784,235 | 1/1974 | Kessler | 285/21 |
| 4,094,536 | 6/1978 | Cole et al. | 285/148.13 X |
| 4,284,297 | 8/1981 | Godkin | 285/55 X |
| 4,482,170 | 11/1984 | Jacobson et al. | 285/55 |
| 4,588,214 | 5/1986 | Guest | 285/323 |
| 4,681,351 | 7/1987 | Barthlolmew | 285/319 |
| 4,715,624 | 12/1987 | Frye | 285/55 |
| 4,793,638 | 12/1988 | Baldwin | 285/148.13 |
| 4,997,214 | 3/1991 | Reese | 285/174 |
| 5,174,611 | 12/1992 | Byrd et al. | 285/351 X |
| 5,326,137 | 7/1994 | Lorenz et al. | 285/55 |
| 5,609,370 | 3/1997 | Szabo et al. | 285/351 X |

FOREIGN PATENT DOCUMENTS 2095779  10/1982  United Kingdom ..................... 285/55

*Primary Examiner*—Dave W. Arola
*Attorney, Agent, or Firm*—C. Clark Dougherty, Jr.

[57] ABSTRACT

The present invention provides an improved metal to plastic pipe transition fitting. The transition fitting basically comprises a metal sleeve having a pair of metal pipe sections attached thereto and an annular groove within the interior thereof. A plastic pipe is disposed within the metal sleeve which extends through one of the metal pipe sections. The end of the plastic pipe within the metal sleeve includes a plurality of spaced plastic retention rings and a snap ring attached thereto and the snap ring is engaged within the annular groove in the metal sleeve. At least one O-ring is disposed between the retention rings on the plastic pipe and a metal stiffening insert is disposed within the end portion of the plastic pipe within the metal sleeve.

15 Claims, 3 Drawing Sheets

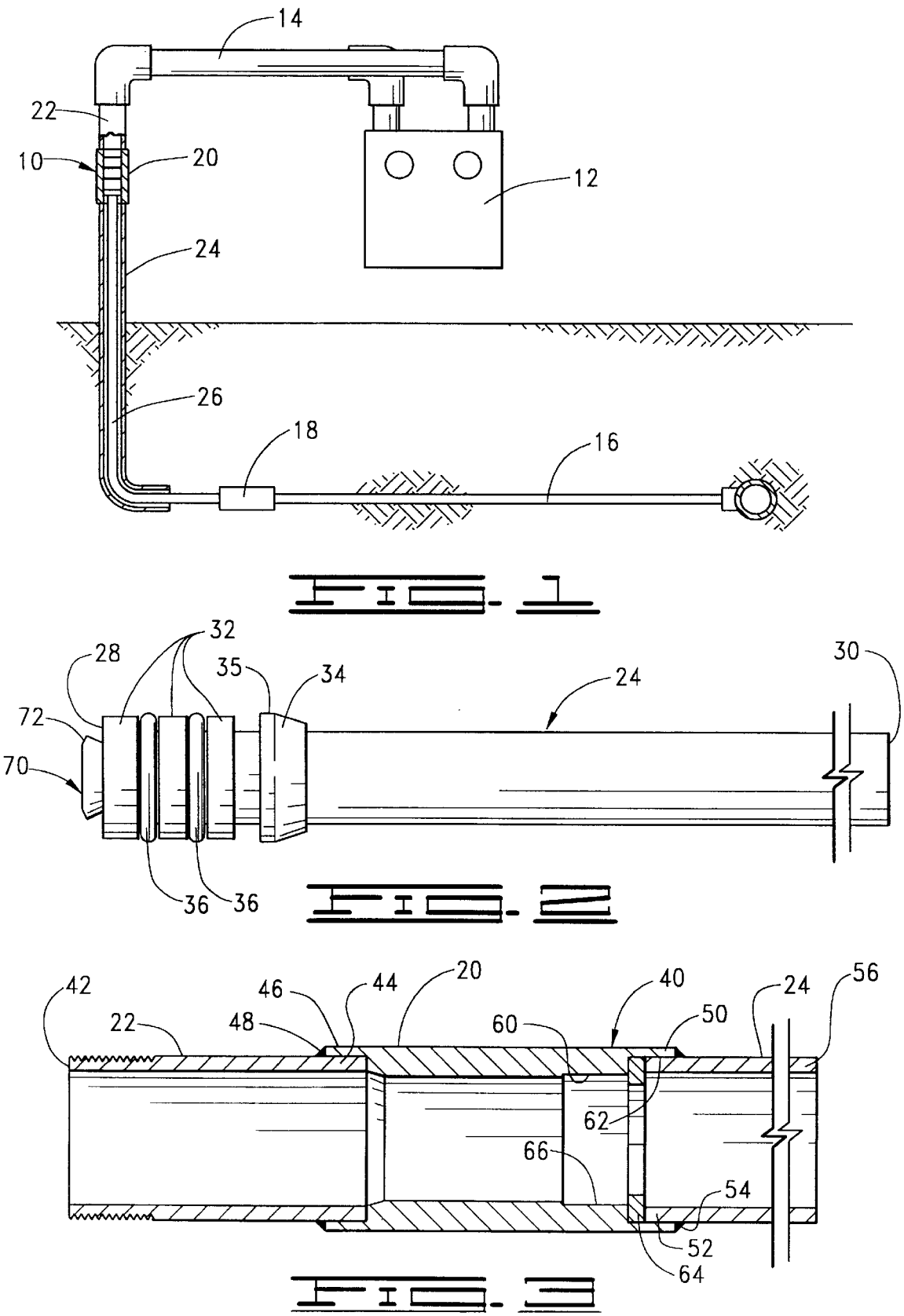

METAL TO PLASTIC PIPE TRANSITION FITTING

BACKGROUND OF THE INVENTION

1. Field of the Invention

The present invention relates to an improved metal to plastic transition fitting which can be utilized in various applications such as a gas meter riser.

2. Description of the Prior Art

The use of plastic pipe such as polyethylene pipe in gas distribution systems has become commonplace. As a result, there are many instances where plastic pipe must be connected to metal pipe. For example, above ground gas meters are often connected by metal pipe to below ground plastic gas service pipe. The metal pipe and plastic pipe are joined together at a transition fitting. A meter riser is often utilized to extend from below ground to a gas meter above ground. Such meter risers have heretofore been comprised of a metal pipe which connects between the gas meter and a metal to plastic pipe transition fitting. The transition fitting is in turn connected to a double walled riser which is comprised of an outer metal pipe and an inner plastic pipe. The inner plastic pipe extends through and out of the outer metal pipe. The outer metal pipe provides protection to the inner plastic pipe and the plastic pipe is sealed to the metal pipe within the transition fitting. Examples of such meter risers are described in U.S. Pat. Nos. 4,715,624 issued to Frye on Dec. 29, 1987 and 5,326,137 issued to Lorenz et al. on Jul. 5, 1994.

Metal to plastic pipe transition fittings utilized as meter risers and in other applications have heretofore been relatively complicated and difficult to assemble. Accordingly, there is a continuing need for an improved metal to plastic pipe transition fitting which is relatively simple to manufacture and assemble and is less costly than comparable prior art transition fittings.

SUMMARY OF THE INVENTION

The present invention provides an improved metal to plastic pipe transition fitting which meets the needs described above and overcomes the deficiencies of the prior art. The metal to plastic pipe transition fitting of this invention is basically comprised of a metal sleeve having first and second ends adapted to be attached to a pair of metal pipe sections and having an annular groove formed within the interior thereof. A first metal pipe section which is adapted to be connected to a complimentary metal pipe or fitting is attached to the first end of the metal sleeve. A second metal pipe section is attached to the second end of the metal sleeve, and the end portion of a plastic pipe which extends through the second metal pipe section is disposed within the metal sleeve. The end portion of the plastic pipe within the metal sleeve includes a plurality of spaced plastic retention rings and a plastic or metal snap ring attached thereto whereby the retention rings fit snugly within the interior of the metal sleeve and the snap ring fits into the annular groove therein. At least one O-ring seal is disposed between the adjacent spaced plastic retention rings on the plastic pipe and a metal stiffening insert is disposed within the end portion of the plastic pipe within the metal sleeve.

In the assembly of the metal to plastic pipe transition fitting of this invention, the first and second metal pipe sections are attached to the metal sleeve such as by welding and the plastic retention rings and plastic snap ring are attached to an end portion of the plastic pipe. One or more O-rings are placed between the retention rings, and the other end of the plastic pipe is passed through the interior of the welded metal sleeve and pipe sections. Thereafter, the plastic pipe is pulled through the metal sleeve and pipe sections until the plastic snap ring snaps into the annular groove formed within the metal sleeve and the plastic retaining rings and O-rings therebetween fit snugly within the metal sleeve.

In the assembly of an alternate embodiment of the metal to plastic pipe transition fitting of this invention, the first and second metal pipe sections are attached to the metal sleeve and the plastic retention rings are attached to an end portion of the plastic pipe. One or more O-rings are placed between some of the retention rings and a plastic or metal snap ring is placed between other of the retention rings. The end of the plastic pipe having the retention rings, O-rings and snap ring attached thereto is passed through the second metal pipe section to the metal sleeve. Thereafter, the end of the plastic pipe having the retaining rings, O-rings and snap ring attached thereto is pushed into the metal sleeve until the snap ring snaps into the annular groove formed within the metal sleeve and the retaining rings and O-rings fit snugly within the metal sleeve.

It is, therefore, a general object of the present invention to provide an improved metal to plastic pipe transition fitting.

Other and further objects, features and advantages of the present invention will be readily apparent upon a reading of the description of preferred embodiments which follows when taken in conjunction with the accompanying drawings.

BRIEF DESCRIPTION OF THE DRAWINGS

FIG. 1 is a schematic illustration, partially in cross section, of a gas meter connected to a plastic service pipe by a transition fitting of this invention in the form of a meter riser.

FIG. 2 is a side elevational view of the plastic pipe of the transition fitting of this invention having spaced plastic retention rings, O-ring seals and a plastic snap ring attached thereto and having a metal stiffening insert therein.

FIG. 3 is a side cross sectional view of the metal sleeve and pipe section assembly of this invention.

DESCRIPTION OF PREFERRED EMBODIMENTS

Figure 4:
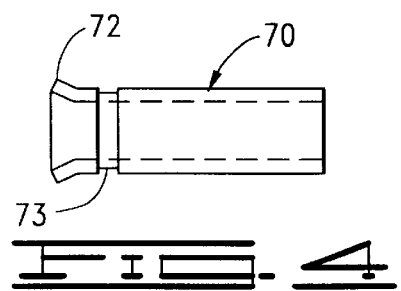
FIG. 4 is a side elevational view of the metal stiffening insert of this invention.

Referring now to the drawings and particularly to FIG. 1, a transition fitting of the present invention in the form of a meter riser is illustrated schematically and generally designated by the numeral 10. The transition fitting 10 is shown connected to a gas meter 12 by a metal pipe assembly 14. The plastic pipe of the transition fitting 10 is connected underground to a gas service pipe 16 by a plastic coupling 18. As will be described further hereinbelow, the transition fitting 10 is comprised of a metal sleeve 20 having first and second metal pipe sections 22 and 24, respectively, attached thereto and a plastic pipe 26 sealingly connected within the metal sleeve 20. The plastic pipe 26 is disposed within the metal sleeve 20 and the second metal pipe section 24 of the transition fitting 10 and the end 30 extends outside of the metal pipe section 24 a distance whereby it can be connected to a complimentary plastic pipe or fitting, e.g., the fitting 18.

Referring now to FIG. 2, the plastic pipe 26 of the transition fitting 10 without the 90° bend is illustrated in detail. The plastic pipe 26, which can be formed of polyethylene or other suitable plastic material, has a first end 28 and a second end 30. The portion of the plastic pipe 26 adjacent to the first end 28 thereof includes three spaced plastic retention rings 32 and a plastic snap ring 34 attached thereto. While the retention rings 32 and snap ring 34 can be attached to the pipe 26 in various ways, they are preferably attached by being injection molded onto the pipe 26. Disposed between adjacent retention rings 32 are a pair of conventional O-ring seals 36. A cylindrical metal stiffening insert 70 which will be described further hereinbelow is positioned within the first end portion of the plastic pipe 26.

Referring now to FIG. 3, the metal sleeve 20 of the transition fitting 10 and the first and second metal pipe sections 22 and 24 are illustrated in a welded assembly generally designated by the numeral 40. The first metal pipe section 22 has a first end 42 and a second end 44. The portion of the metal pipe section 22 adjacent to the first end 42 thereof is preferably threaded for connection to a complimentary pipe fitting (not shown). The portion of the pipe section 22 adjacent to the second end 44 thereof is attached to the first end 46 of the metal sleeve 20, preferably by a seal weld 48. The second end 50 of the metal sleeve 20 is attached to the portion of the second metal pipe section 24 adjacent to the first end 52 thereof, preferably by a seal weld 54. As will be understood by those skilled in the art, the second end 56 of the metal pipe section 24 can be a relatively short distance from the first end 52 thereof or it can be a relatively long distance from the first end 52 and can include a 90° bend as is illustrated in FIG. 1.

The metal sleeve 20 includes a first counterbore 60 formed therein and a second larger counterbore 62 formed therein. A metal washer or ring 64 is disposed in the second counterbore 62 adjacent the first end 52 of the second metal pipe section 24. The counterbore 60 and the metal ring 64 form an internal annular groove 66 within the second end portion of the metal sleeve 20. As will be understood by those skilled in the art, the groove 66 can optionally be internally machined within the second end portion of the metal sleeve 20 whereby the use of the ring 64 is unnecessary. In another alternate technique, the thickness of the walls of the second metal pipe section 24 can be increased to thereby avoid the necessity of the ring 24. However, the use of the ring 24 is presently preferred in that it is the most economical.

Referring now to FIG. 4, the cylindrical metal stiffening insert 70 referred to above is illustrated. The insert 70 is utilized to stiffen the first end portion 28 of the plastic pipe 26 within the metal sleeve 20. The insert 70 includes an external annular groove 73 formed thereon and an end 72 thereof is preferably flared outwardly as shown. The insert 70 is positioned within the interior of the first end portion of the plastic pipe 26 with the flared end 72 thereof adjacent to the first end 28 of the pipe 26 as shown in FIG. 2. Preferably, the insert 70 is placed within the plastic pipe 26 prior to when the retaining rings 32 and snap ring 34 are attached to the plastic pipe 26. The external groove 73 in the insert 70 functions to hold the insert within the plastic pipe 26. When the retaining rings 32 and snap ring 34 are molded onto the plastic pipe 26, the heat causes the plastic material forming the pipe 26 to expand or flow into the external groove 73 of the insert 70 whereby it is rigidly retained therein.

Figure 5:
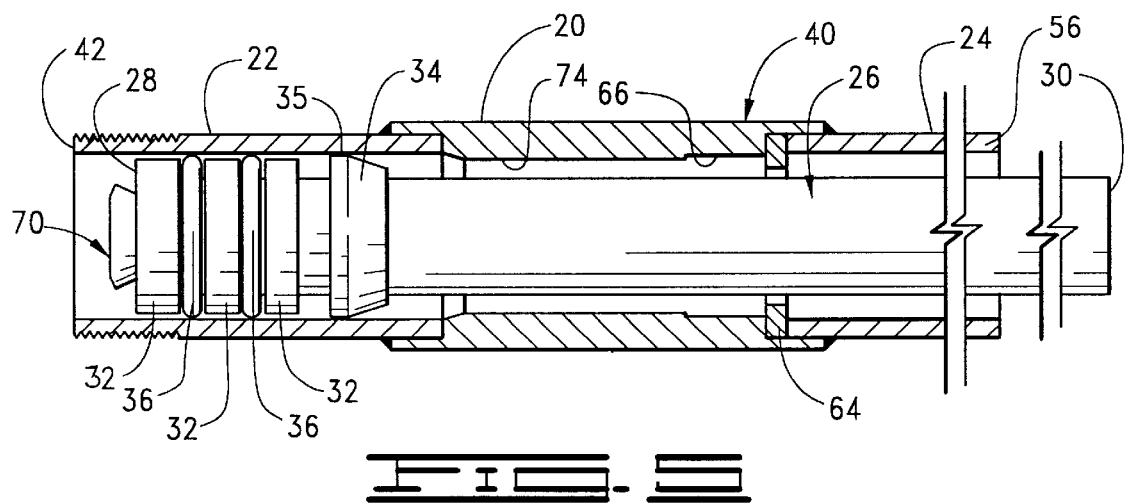
FIG. 5 is a cross sectional view of the metal sleeve and pipe section assembly of FIG. 3 having the plastic pipe of FIG. 2 disposed therein prior to pulling the end portion of the plastic pipe having the plastic retaining rings, O-ring seals and plastic snap ring attached thereto into the metal sleeve.
Figure 6:
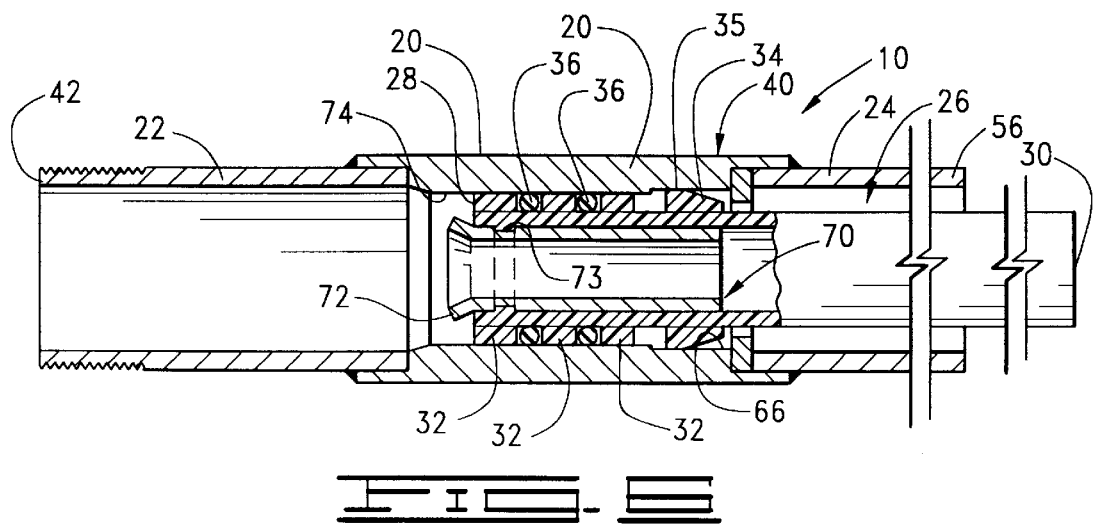
FIG. 6 is a cross sectional view similar to FIG. 5 showing the plastic pipe in partial cross section after the end portion thereof having the plastic retaining rings, O-ring seals and plastic snap ring attached thereto has been pulled into the metal sleeve.

Referring now to FIGS. 5 and 6, the assembly of the plastic pipe 26 within the metal sleeve and pipe section assembly 40 is illustrated. As shown in FIG. 5, the end 30 of the pipe 26 is inserted into the first end 42 of the first metal pipe section 22 and pushed into and through the metal sleeve and pipe section assembly 40 until the end 30 of the plastic pipe 26 extends outside of and a distance past the end 56 of the second metal pipe section 24. As best shown in FIG. 6, the spaced plastic retention rings 32 are of rectangular shape in cross section and have a thickness such that the retention rings 32 fit snugly within the cylindrical interior 74 of the metal sleeve 20. The plastic snap ring 34 is of a cross-sectional shape whereby at least a portion of the outer surface thereof slopes downwardly in a direction toward the second end 30 of the plastic pipe 26. The size of the snap ring 34 is such that its trailing edge portion 35 will snap into the annular groove 66.

The assembly of the transition fitting 10 is completed by pulling the plastic pipe 26 through the metal sleeve and pipe section assembly 40 until the plastic snap ring 34 reaches and its trailing edge portion 35 snaps into the annular groove 66 within the interior of the metal sleeve 20 and the plastic retention rings 32 and O-rings 36 are moved into the interior 74 of the metal sleeve 20, all as shown in FIG. 6.

When the threaded end portion 42 of the first metal pipe section 22 is sealingly connected to a metal pipe and the end portion 30 of the plastic pipe 26 is sealingly connected to a plastic pipe, fluid pressure within the resulting metal and plastic pipes and within the transition connection 10 is prevented from escaping into the atmosphere by way of the open end 56 of the pipe section 24 by the O-ring seals 36. Further, if the plastic pipe 26 elongates or contracts within the metal sleeve 20 and pipe section 24, the portion of the pipe 26 adjacent the end 28 thereof can move within the interior 74 of the metal sleeve 20 without breaking the seal afforded by the O-rings 36. That is, the snap ring 34 attached to the plastic pipe 26 can move longitudinally within the annular groove 66 in the metal sleeve 20 as can the plastic retention rings 32 and O-ring seals 36 within the interior 74 of the metal sleeve 20.

Figure 7:
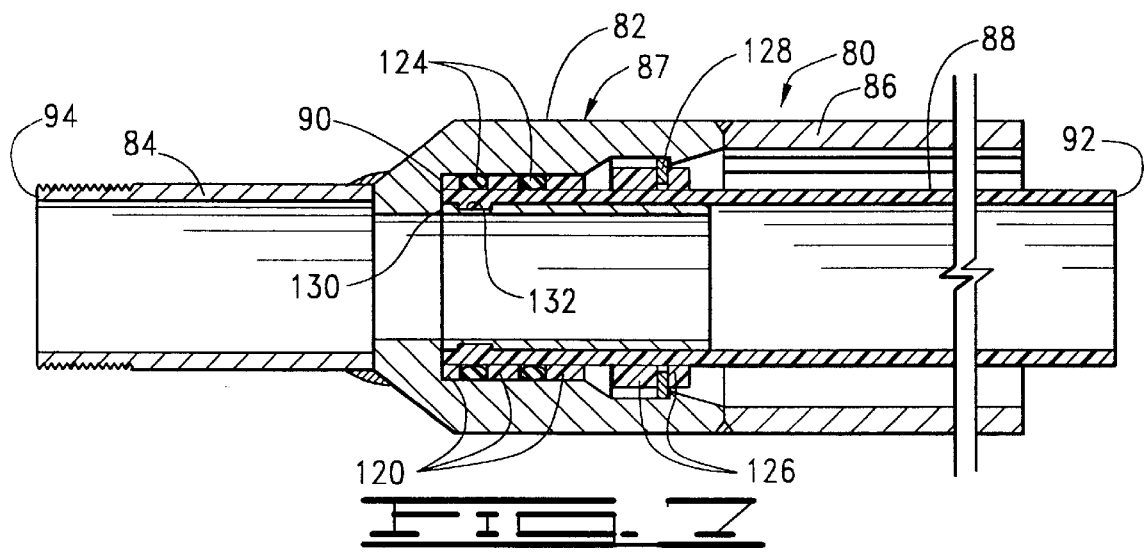
FIG. 7 is a cross-sectional view of an alternate embodiment of the transition fitting of this invention after it has been assembled.
Figure 8:
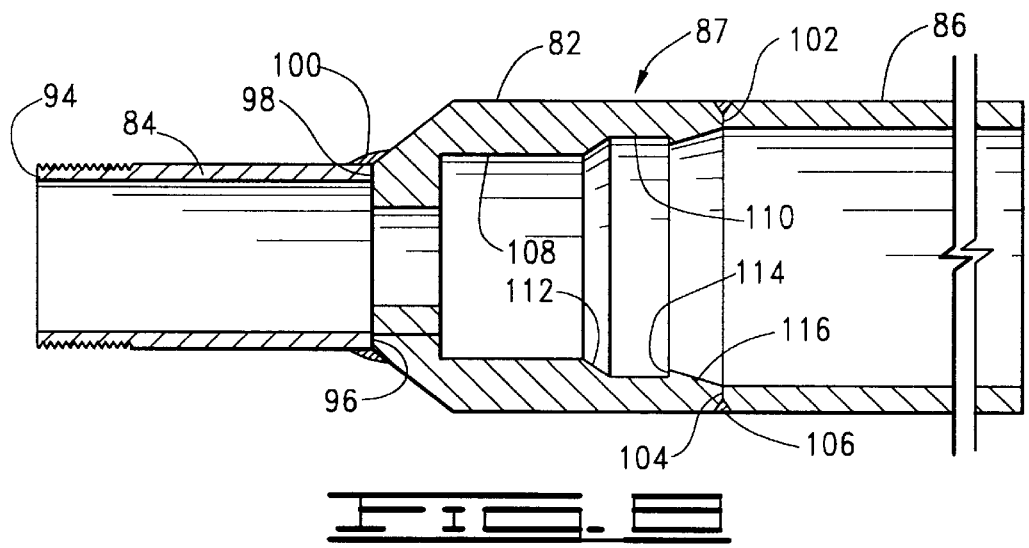
FIG. 8 is a side cross-sectional view of the metal sleeve and pipe section assembly of the second embodiment of the transition fitting of this invention.
Figure 9:
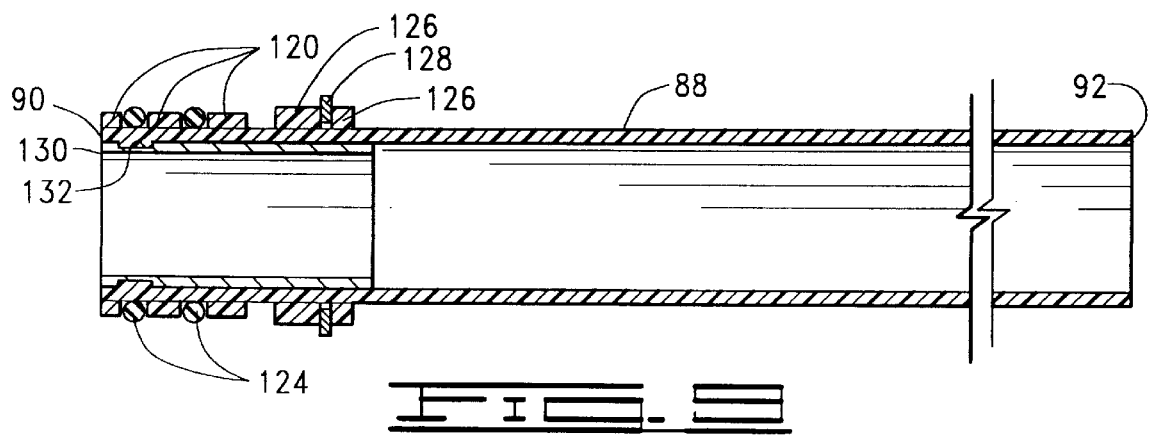
FIG. 9 is a side cross-sectional view of the plastic pipe of the second embodiment of this invention having spaced plastic retention rings, O-ring seals and a plastic or metal snap ring attached thereto and having a metal stiffening insert thereon.

Referring now to FIGS. 7–9, a second embodiment of the transition fitting of the present invention is illustrated and generally designated by the numeral 80. The transition fitting 80 is similar to the transition fitting 10 described above, except that it is assembled differently, i.e., the first end of the plastic pipe is inserted directly into the metal sleeve and pipe section assembly. Referring specifically to FIG. 7, the transition fitting 80 is comprised of a metal sleeve 82 having first and second metal pipe sections 84 and 86, respectively, attached thereto. The assembly consisting of the metal sleeve 82 and the metal pipe sections 84 and 86 is designated by the numeral 87. A plastic pipe 88 having a first end 90 and a second end 92 is disposed within the metal sleeve 82 and the second metal pipe section 86. The portion of the plastic pipe 88 adjacent to the end 90 is sealingly retained within the metal sleeve 82 and the other end 92 extends outside of the metal pipe section 86 a distance whereby it can be connected to a complimentary plastic pipe or fitting.

Referring now to FIG. 8, the metal sleeve and pipe section assembly 87 is illustrated. The first metal pipe section 84 has a first end 94 and a second end 96. The portion of the metal pipe section 84 adjacent to the first end 94 thereof is threaded for connection to a complimentary pipe fitting (not shown). The second end 96 of the pipe section 84 is attached to the first end 98 of the metal sleeve 82, preferably by a seal weld 100. The second end 102 of the metal sleeve 82 is attached to the first end 104 of the second metal pipe section 86, preferably by a seal weld 106.

The metal sleeve 20 includes a first counterbore 108 formed therein and an internal annular groove 110 formed within the counterbore 108. The side 112 of the annular groove 110 closest to the first end 98 of the metal sleeve 82 is beveled. The other side of the internal annular groove 110 is perpendicular to the bottom of the groove and a second beveled counterbore 116 intersects with the side 114 of the annular groove 110.

Referring now to FIG. 9, the plastic pipe 88 having a first end 90 and a second end 92 is illustrated in detail. The portion of the plastic pipe 88 adjacent to the first end 90 thereof includes three spaced plastic retention rings 120 which form a pair of spaced annular grooves having O-rings 124 disposed therein. Two additional spaced retention rings 126 are attached to the first end portion of the plastic pipe 88 which provide a groove for receiving a snap ring 128. The snap ring 128 can be formed of either metal or plastic and is of a type which expands out of or is depressed into the groove formed by the retention rings 126 depending upon the diameter of the surface adjacent thereto. Preferably, the snap ring 128 is a metal snap ring having a C-shaped cross-section.

While the retention rings 120 and 126 can be attached to the pipe 88 in various ways, they are preferably attached by being injection molded onto the pipe 88. A cylindrical metal stiffening insert 130 similar to the insert 70 described above in connection with the transition fitting 10 is positioned within the interior of the first end portion of the plastic pipe 88. The insert 130 includes an external annular groove 132 formed therein whereby when the retention rings 120 and 126 are injection molded onto the pipe 88, plastic material forming the pipe 88 expands or flows into the external groove 132 of the sleeve 130 whereby it is rigidly retained therein.

In the assembly of the plastic pipe 88 within the metal sleeve and pipe section assembly 87, the first end portion of the plastic pipe 88 is inserted by way of the interior of the metal pipe section 86 into the interior of the metal sleeve 82. As the plastic pipe 88 is inserted, the beveled surfaces 114 and 112 of the metal sleeve 82 compress the O-rings 124 and the snap ring 128 so that the O-rings slide into and fit snugly within the interior of the counterbore 108 within the metal sleeve 82 and provide a seal therein, and so that the snap ring 128 is compressed and then expands or snaps into the annular groove 110, all as shown in FIG. 7.

Thus, the present invention is well adapted to carry out the objects and attain the ends and advantages mentioned as well as those which are inherent therein. While numerous changes may suggest themselves to those skilled in the art, such changes are encompassed within the spirit of this invention as defined by the appended claims.

What is claimed is:

1. An improved metal to plastic pipe transition fitting comprising:

a metal sleeve having first and second ends adapted to be attached to a pair of metal pipe sections and having an annular groove formed within the interior thereof;

a first metal pipe section attached to said first end of said metal sleeve;

a second metal pipe section attached to said second end of said metal sleeve;

a plastic pipe disposed within said metal sleeve and extending through said second metal pipe section having first and second ends, said first end portion of said plastic pipe having a plurality of spaced plastic retention rings attached thereto and a snap ring attached thereto whereby said retention rings fit snugly within the interior of said metal sleeve and said snap ring fits into said annular groove therein;

at least one O-ring seal disposed between said spaced plastic retention rings on said plastic pipe in sealing engagement with said metal sleeve and said plastic pipe; and a metal stiffening insert disposed within said first end portion of said plastic pipe.

2. The transition fitting of claim 1 wherein said spaced plastic retention rings are injection molded onto said plastic pipe.

3. The transition fitting of claim 1 wherein said plastic pipe includes at least three spaced plastic retention rings attached thereto.

4. The transition fitting of claim 3 wherein at least two O-ring seals are disposed between said spaced plastic retention rings on said plastic pipe.

5. The transition fitting of claim 1 wherein said plastic retaining rings are of rectangular cross-sectional shape.

6. The transition fitting of claim 1 wherein said snap ring is formed of plastic or metal.

7. The transition fitting of claim 1 wherein said first and second metal pipe sections are welded to said metal sleeve.

8. The transition fitting of claim 1 wherein said first metal pipe section is threaded at the end thereof opposite said metal sleeve.

9. The transition fitting of claim 1 wherein said second metal pipe section is elongated and includes a bend therein whereby said fitting can be utilized as a gas meter riser.

10. An improved plastic to metal pipe transition fitting comprising:

a metal sleeve having first and second ends adapted to be attached to a pair of metal pipe sections and having an annular groove formed within the interior thereof;

a first metal pipe section attached to said first end of said metal sleeve having threads formed on the end thereof opposite said metal sleeve for threaded connection to a complimentary metal pipe or fitting;

a second metal pipe section attached to said second end of said metal sleeve;

a plastic pipe disposed within said metal sleeve and extending through said second metal pipe section having first and second ends, said first end portion of said plastic pipe having spaced plastic retention rings attached thereto and a plastic snap ring attached thereto whereby said retention rings fit snugly within the interior of said metal sleeve and said snap ring fits into said annular groove therein;

at least one O-ring seal disposed between said spaced plastic retention rings on said plastic pipe in sealing engagement with said metal sleeve and said plastic pipe; and a metal cylindrical insert disposed within said first end portion of said plastic pipe to stiffen said plastic pipe.

11. The transition fitting of claim 10 wherein said spaced plastic retention rings and said plastic snap ring are injection molded onto said plastic pipe.

12. The transition fitting of claim 10 wherein said plastic retaining rings are of rectangular cross-sectional shape.

13. The transition fitting of claim 10 wherein said plastic snap ring is of a cross-sectional shape whereby the outer surface thereof slopes downwardly in a direction toward said second end of said plastic pipe.

14. The transition fitting of claim 10 wherein said first and second metal pipe sections are welded to said metal sleeve.

15. The transition fitting of claim 10 wherein said second metal pipe section is elongated and includes a 90° bend therein whereby said fitting can be utilized as a gas meter riser.

* * * * *